(No Model.)

G. A. DAVIDSON.
MACHINE FOR SAWING STONE.

No. 409,670. Patented Aug. 27, 1889.

Witnesses:
S. B. Brewer,
H. V. Scattergood.

Inventor:
George A. Davidson,
by William H. Low,
Attorney.

UNITED STATES PATENT OFFICE.

GEORGE A. DAVIDSON, OF MALDEN, ASSIGNOR OF ONE-HALF TO HORACE T. CASWELL, OF TROY, NEW YORK.

MACHINE FOR SAWING STONE.

SPECIFICATION forming part of Letters Patent No. 409,670, dated August 27, 1889.

Application filed March 8, 1887. Serial No. 230,132. (No model.)

*To all whom it may concern:*

Be it known that I, GEORGE A. DAVIDSON, of Malden, in the county of Ulster and State of New York, have invented new and useful Improvements in Machines for Sawing Stone, of which the following is a full and exact description, reference being had to the accompanying drawings, which form part of this specification, and in which—

Figure 1:
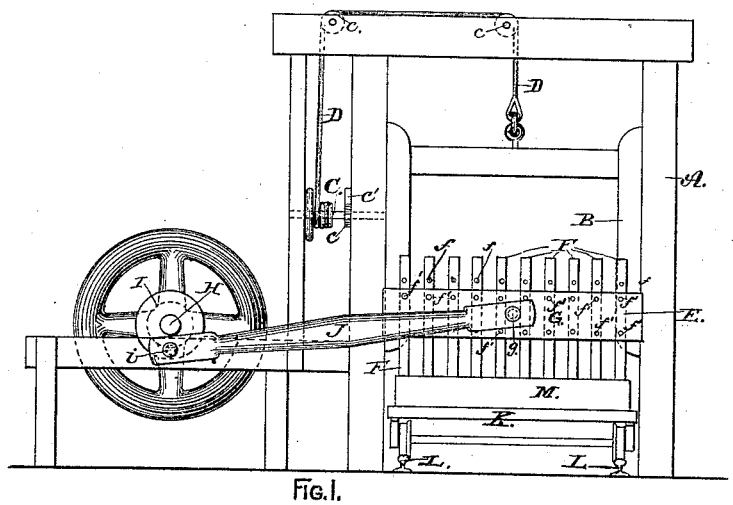
Figure 2:
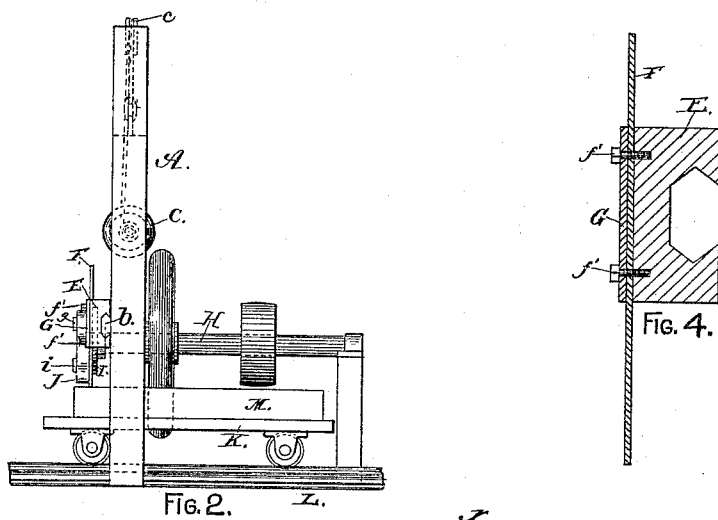
Figure 4:
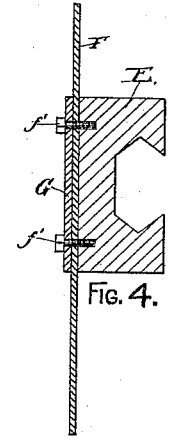
Figure 3:
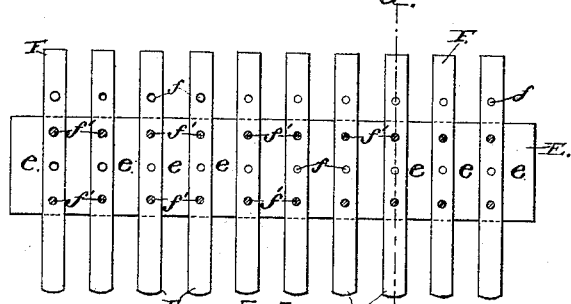

Figure 1 is a front elevation of a machine embodying my invention; Fig. 2, a side elevation of the same; Fig. 3, an enlarged and detached front elevation of the reciprocating cutter-head with the face-plate removed therefrom, and Fig. 4 an enlarged and detached transverse section of the reciprocating cutter-head at the line X X on Fig. 3.

My invention relates to improvements in machines for sawing stone in which chilled shot or other suitable abrading material is used conjunctively with the cutting mechanism; and it consists in providing the machine with a vertically-sliding gate having a reciprocating cutter-head fitted to move thereon, the said cutter-head being provided with a series of rigidly-held but vertically-adjustable pendent cutters, made of flat bars of metal, which are arranged edgewise in succession, and with their edges turned toward the direction of the movements of the cutter-head.

Simultaneously herewith I have filed another application, Serial No. 230,133, for a patent for a stone-sawing machine which differs from this in the mode of attaching the cutters to the cutter-head.

In the drawings, A is the frame-work of the machine; B, a sliding gate fitted to move up and down in or on said frame-work; C, a windlass connected by a rope or chain D to said sliding gate for the purpose of raising the latter when required. The shaft of said windlass is provided with a ratchet-wheel $c$, in which a pawl $c'$ will engage to sustain the sliding gate at any height to which it may be raised.

E is a horizontally-reciprocating cutter-head fitted to slide on a guide $b$ or any other device for guiding said cutter-head on the sliding gate B. Said cutter-head is provided with a series of pendent cutters F, which are formed of flat bars of metal of a thickness to produce the required width of cut or kerf, and preferably made with rounded lower ends, as shown in Fig. 3, but which may be made with square ends. Said cutters are spaced and rigidly held edgewise by the ribs $e$ of the cutter-head, said ribs being spaced at such distances apart that the cutters F will fit snugly and unyieldingly between them, and the said cutters are vertically adjustable in the cutter-head to adapt them for sawing different thicknesses of stone, and for that purpose they are provided with a series of holes $f$, (shown in Fig. 3,) through which bolts $f'$ engage to maintain said cutters at a required height. A face-plate G is removably attached to said cutter-head for the purpose of securing the cutters F sidewise.

H is the driving-shaft, provided with a crank or crank-wheel I, whose crank-pin $i$ is connected by the pitman J to a wrist-pin $g$ of the cutter-head. The rotations of the driving-shaft H will produce a reciprocating motion of the cutter-head E in a manner that will be readily understood by any intelligent mechanic. A car K is preferably employed for adjusting the stone M in the machine. Said car is fitted to run on the track-rails L.

The operation of my machine is as follows: The sliding gate B being raised and held in place by the windlass C, a stone M is placed on the car K and properly adjusted directly under the path of the cutters F. The sliding gate B is then let down until the lower end of the cutters F bear upon the top of the stone, where the combined weight of the sliding gate, cutter-head, and cutters will lend material aid in cutting the stone. The abrading material and water or other liquid are next distributed over the top of the stone along the line where the cut is to be made. The driving-shaft H is set in motion to reciprocate the cutter-head E, and thereupon the cutters F, in conjunction with the abrading material, which should be constantly fed into the kerf, will produce a cut that will rapidly separate the stone into the parts required. When preferred, a screw or racks and pinions, or other suitable means, may be substituted for the windlass C for raising and lowering the sliding gate, and when either of said substitutes is used said sliding gate can be fed down by a positive power, instead of gravity, as when the windlass is used.

I claim as my invention—

The combination, with a sliding gate B, fitted to move up and down in or on the framework A and provided with a guide b, of a reciprocating cutter-head E, fitted to slide on said guide and provided with a series of rigid pendent cutters F, which are made of flat bars of metal having parallel edges, and which are spaced apart and held in a rigidly vertical position by ribs e on said cutter-head, said cutters being fitted to receive a vertical adjustment in said cutter-head independently of the up-and-down feeding movement of the latter, as and for the purpose specified.

GEORGE A. DAVIDSON.

Witnesses:
   TOMPKINS HOMMEL,
   H. C. BOGARDUS.